Nov. 4, 1924.  1,514,541
G. L. LAMB
GLARESHIELD FOR AUTOMOBILES
Filed Sept. 12, 1923  2 Sheets-Sheet 1
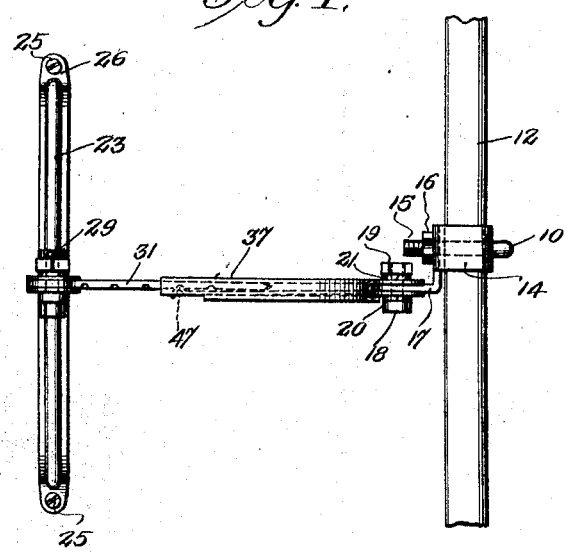
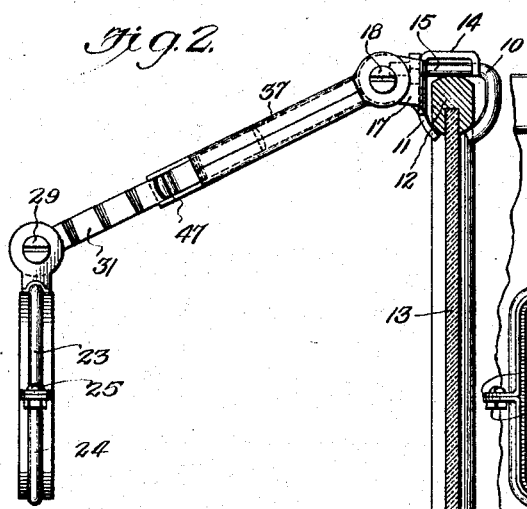
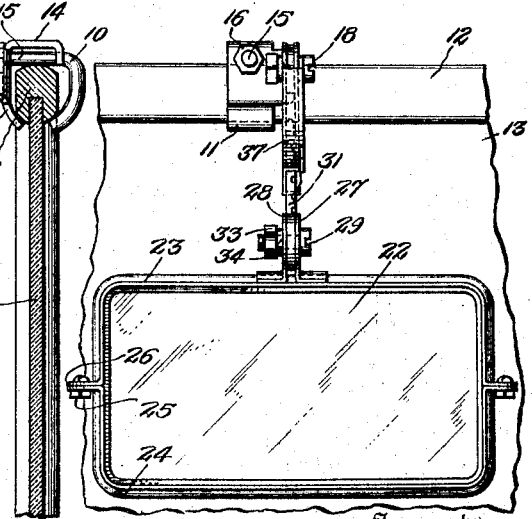
Inventor
George L. Lamb
by Wilkinson & Giusta
Attorneys.

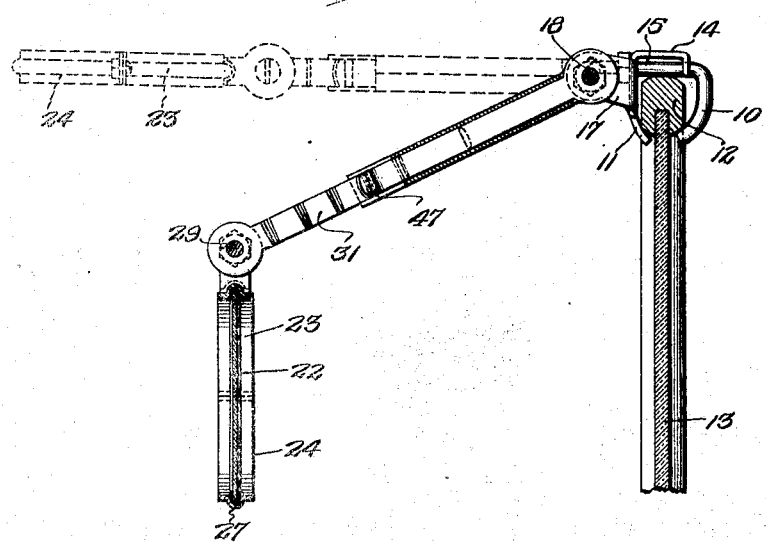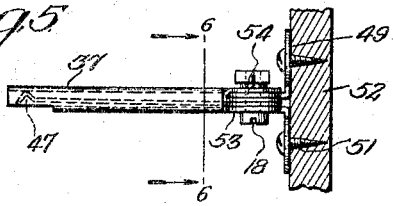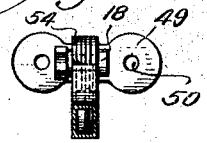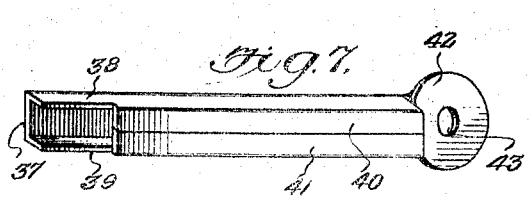

Patented Nov. 4, 1924.

1,514,541

UNITED STATES PATENT OFFICE.

GEORGE L. LAMB, OF NAPPANEE, INDIANA.

GLARESHIELD FOR AUTOMOBILES.

Application filed September 12, 1923. Serial No. 662,345.

*To all whom it may concern:*

Be it known that I, GEORGE L. LAMB, a citizen of the United States, residing at Nappanee, in the county of Elkhart and State of Indiana, have invented certain new and useful Improvements in Glareshields for Automobiles; and I do hereby declare the following to be a full, clear, and exact description of the invention, such as will enable others skilled in the art to which it appertains to make and use the same.

The present invention relates to improvements in glare shields for automobiles and more particularly resides in the provision of a small adjustable glass situated within the vehicle and convenient to the driver's hand, said glass being of a color to absorb the glare and the strength of the headlights of approaching automobiles, the glare of the sun, etc.

I am aware that devices have been heretofore proposed for accomplishing this result and that the same are in restricted use, but for mechanical reasons and because of the relatively great expense involved devices as at present known have not come into a very large or general use.

It is an object of the present invention to provide a very simple and exceedingly compact device which will form an attractive accessory and which will occupy very little space while admitting of numerous adjustments to bring the shield at a proper position for the particular driver.

Other objects of the invention are to reduce the expense of the article materially and to provide for its attachment easily and conveniently upon either open or closed cars.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of a portion of a vehicle wind shield frame showing an improved glare shield applied thereto.

Figure 2 is a vertical section taken through the wind shield and showing the improved shield and its support edgewise.

Figure 3 is a fragmentary elevation of the wind shield showing the glare shield in elevation from the inside of the vehicle.

Figure 4 is a sectional view taken through the wind shield and through the glare shield and showing two positions of the glare shield.

Figure 5 is a horizontal section through a portion of the glass vehicle showing the method of attachment.

Figure 6 is a cross section taken on the line 6—6 in Figure 5.

Figure 7 is a perspective view of the channel member.

Figure 8 is a similar view of the notched bar.

Figure 9 is also a perspective view showing the locking dog detached, and

Figure 10 is a perspective view of a spring washer employed.

Referring more particularly to the drawings in Figures 1 to 4 inclusive a device is shown arranged and equipped for use on an open car in which 10 and 11 designate opposite complemental clamp members or claws adapted to engage upon opposite sides of the upper rail 12 of the wind shield indicated at 13. The inner claw 11 is provided with a yoke piece 14 bearing upon the horizontal shank 15 of the outer claw 10, this shank piece being passed through the upper portion of the inner claw 10 and being threaded as indicated in Figure 1 to receive the nut 16 by which the clamp is held tightly upon the wind shield frame rail.

The inner claw 11 is also provided with a lateral lug 17 which is bent at right angles to the plane of the claw and substantially at right angles to the wind shield, such lug being perforated to receive the pivot bolt 18 provided with the nut 19 and carrying the spring washers 20 and 21 which exert the necessary friction or tension upon the arm which carries the glare shield. The glare shield is composed of a pane of glass 22 of an amber, green or other color which will have a tendency to absorb and diminish the strong rays of light emanating from an approaching vehicle's head lamps. The glass 22 may be of the rectangular shape shown or an oval or other shape and of a suitable size for extending before both eyes of the vehicle driver. This glass is held in a frame composed of upper and lower members 23 and 24 which will be complements of one another and of the shape of the glass, the members being provided with a channel as indicated in Figure 4 for receiving the margin or edge of the pane 22. The two half portions of the frame are secured together in any suitable way as for instance by the bolts 25 passing through the abutting perforated ears 26 of the frame parts. The channels of the frame will be lined with rubber 27 or other appropriate material for the purpose of cushioning the glass and absorbing shocks incident to road travel.

The frame is provided with a pair of perforated ears 27 and 28 spaced apart at the upper central portion of the frame and receiving a bolt 29 by which the frame and the glass are enabled to pivot about the round head 30 of the adjustable supporting bar 31, which round head is perforated as indicated at 32 in Figure 8 to receive the pivot bolt 29 and this head 30 is received between the perforated ears 27 and 28. A nut 33 is threaded upon the bolt 28 and a spring washer 34 is interposed between the nut and the ear 28 for the purpose of furnishing the necessary tension or friction to hold the shield in its adjusted position until manually forced to assume a new angular position. The supporting bar 31 is provided with a series of transverse notches 35 extending from edge to edge of the bar and being spaced apart substantially an equal distance and opening out upon one face of the bar, the sides of the notches being beveled or rounded to facilitate the movement of the locking dog thereinto and out of the same. The free end of the bar 31 is beveled as indicated at 36 for the purpose of engaging and prying out the locking dog as hereinafter described.

Now the supporting bar 31 is adapted to slide freely through the channel arm 37 having the side flanges 38 and 39 extending at substantially right angles to the base of the member and provided with the enclosing wings 40 and 41 turned over at right angles from the flanges 38 and 39 and meeting centrally. These flanges extending for the major portion of the channel arm and they serve to substantially enclose the same. The free end of the channel arm 37 is however for an appreciable distance without the wings 40 and 41 in order to allow free play for the locking dog. The channel arm 37 is provided with a head 42 perforated as indicated at 43 and adapted to lie against one side of the perforated lug 17 of the supporting clamp and next the tension spring washer 21. The locking dog 44 is of a size to fit within the channel and against the wings 40 and 41 thereof being provided with a head 45 perforated as at 46 to fit about the pivot bolt 18. The head 45 fits against the opposite face of the lug 17 and the lug spaces the base of the channel arm 37 from the dog 44 so as to admit of slipping the supporting bar 31 between these two elements. The notches 35 of the supporting bar 31 are thus presented to the V-shaped tooth or pawl 47 of the locking dog. The outer free end of the dog is flared as indicated at 48 for cooperating with the channel end 36 of the supporting bar 31.

In the use of the device the parts are assembled upon the vehicle as shown and during daylight and when there is little glare, the device may be shifted up to the dotted line position shown in Figure 4 where it assumes a flat condition against the inside of the top of the vehicle and is entirely out of the way. At night the device may be drawn down to the full line position shown in Figure 4 to bring the glass in front of the eyes of the driver. This is accomplished in a rather easy and convenient manner by simply drawing down the glass frame, the supporting element pivoting about the bolt 18 and the glass and its frame may be adjusted angularly to bring same to the proper angular position preferably at substantially right angles to the line of sight. The supporting bar 31 may be moved in and out of the channel arm 37 as these two have a telescoping engagement and the pawl 47 will engage one of the notches 35 and hold the glare shield in the adjusted position. The shield is thus adjustable toward and from the driver and about two pivotal points so that it may be brought to any desired position.

Now upon closed vehicles the clamp is dispensed with as it is not feasible to use same. However a bracket such as shown at 49 may be suspended having a pair of wings with openings 50 to receive the screws 51 which enter the closed car frame 52 above the wind shield glasses. The bracket wings may both be provided with perforated lugs 53 and 54 while the head 42 of the channel member is situated on the outside of the lug 54, the head 45 of the dog may be placed between the two members and one or more fillers or washers may be inserted.

As shown in Figure 5 the dog projects into the path of the bar 31 so that when the same is inserted the pawl will occupy one of the notches 35 and the open end portion of the channel arm 37 will permit the dog to move back and forth in the lateral direction in shifting in and out of the notches. The rounded condition of the notched edges and the sloping sides of the V-shaped pawl will permit of the adjustment of the bar 31 telescopically within the channel member without the exercise of undue force, but at the same time the arrangement will be effective to prevent any change or displacement due merely to the vibration of the vehicle.

It will be appreciated from the foregoing that the device may be made at small cost and sold in the retailed trade at an attractive price while the mechanical simplicity of the article and its numerous adjustments will recommend it for use where present articles fail.

It is obvious that various changes and modifications may be made in the details of construction and design of the above specifically described embodiment of this invention without departing from the spirit thereof, such changes and modifications being restricted only by the scope of the following claims:

What is claimed is:—

1. A glare shield for vehicles comprising a support on the vehicle, a channel member pivoting frictionally about said support, a dog also pivoting frictionally about said support and being arranged within the channel member but spaced from the base of the channel member, a bar slidable within the channel member and against the base thereof and provided with transverse spaced notches on the side thereof opposite the base for receiving said dog, the end of said notched bar being bevelled and said dog having a flared outer end.

2. A glare shield for vehicles comprising a support on the vehicle, a channel member frictionally pivoted on the support and having flanges and wings extending from the flanges and enclosing the channel member for the major portion of its length, the free end of said channel member being devoid of the wings and open at the side, a dog secured in the channel member against the wings and against pivoting frictionally about the support, said dog extending into the open space devoid of the wings and having at its free end a substantially V-shaped pawl with sloping sides and a flared outer end, a notched bar slidable in said channel member and having a beveled end and sloping side walls for the notches, a frame, a colored glass carried by the frame, and means for frictionally pivoting said frame to the notched bar.

GEORGE L. LAMB.